United States Patent [19]

Kathmann

[11] Patent Number: 4,521,168

[45] Date of Patent: Jun. 4, 1985

[54] SEALING MEANS FOR A ROTARY PISTON ENGINE

[75] Inventor: Peter B. Kathmann, Hamburg, Fed. Rep. of Germany

[73] Assignee: RMC Rotary Motor Company AG, Zug, Switzerland

[21] Appl. No.: 413,072

[22] Filed: Aug. 30, 1982

Related U.S. Application Data

[63] Continuation of Ser. No. 101,222, Dec. 7, 1979, abandoned.

[30] Foreign Application Priority Data

Dec. 11, 1978 [DE] Fed. Rep. of Germany ....... 2853423

[51] Int. Cl.³ ........................ F01C 19/04; F01C 19/08
[52] U.S. Cl. .................................... 418/137; 418/143; 418/146; 418/148; 277/81 P
[58] Field of Search .............. 418/104, 136, 137, 143, 418/146–148, 255; 277/81 P, 81 S

[56] References Cited

U.S. PATENT DOCUMENTS

| | | | |
|---|---|---|---|
| 393,620 | 11/1888 | Conver et al. | 418/255 |
| 697,026 | 4/1902 | Shepard | 418/143 |
| 813,024 | 2/1906 | Renner | 418/143 |
| 928,270 | 7/1909 | Naeder | 418/143 |
| 2,195,968 | 4/1940 | Meador | 418/143 |
| 3,181,509 | 5/1965 | Simon | 418/146 |
| 3,664,778 | 5/1972 | Nilsson | 418/142 |
| 3,816,038 | 6/1974 | Berry | 418/143 |
| 3,863,611 | 2/1975 | Bakos | 418/147 |
| 4,008,014 | 2/1977 | Staebler | 418/142 |
| 4,155,685 | 5/1979 | Kunieda et al. | 418/146 |

FOREIGN PATENT DOCUMENTS

1550049 10/1977 Fed. Rep. of Germany .

Primary Examiner—John J. Vrablik
Attorney, Agent, or Firm—Peter K. Kontler

[57] ABSTRACT

An arrangement which seals three movable bodies with respect to one another, for example in a component used in a motor vehicle, is provided with first sealing bodies which are imbedded in a first rotating body. Sealingly secured in these first sealing bodies are sealing members which follow the circumference of the first rotating body as well as a respective sealing member extending in the axial direction of the rotating body. The sealing members are in sliding sealing engagement with sealing surfaces of angular sealing strips, such sealing surfaces extending normal to the direction of the sealing members which follow the circumference of the rotating body. The angular sealing strips are secured at the opposing ends of a reciprocable second body which radially traverses the rotating body. Preferably, these angular sealing strips are interconnected with the aid of a respective further sealing body positioned on the axial end surfaces of the second body.

7 Claims, 5 Drawing Figures

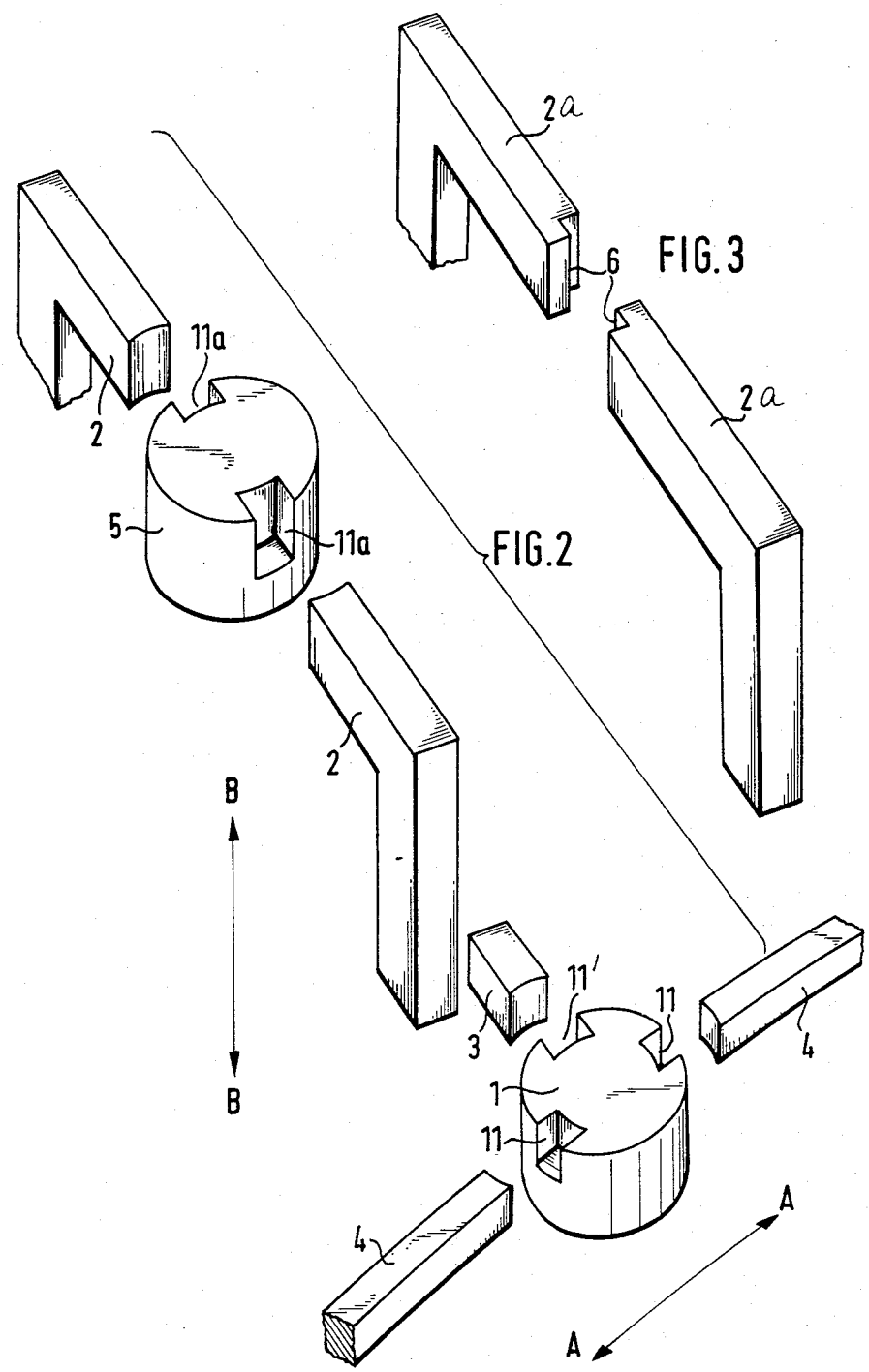

SEALING MEANS FOR A ROTARY PISTON ENGINE

CROSS-REFERENCE TO RELATED CASE

This is a continuation of my copending patent application Ser. No. 101,222 filed Dec. 7, 1979, now abandoned.

BACKGROUND OF THE INVENTION

The present invention relates in general to motor vehicles and in particular to seals used in components which may be employed in such vehicles.

A truly effective gastight seal between relatively movable bodies is of decisive important in many fields of technology, including the construction of motor vehicles and their components.

Reliable gastight seals between two relatively movable bodies have, of course, long been known, as witness the seals between the cylinder and piston of reciprocating piston engines which are widely used to power vehicles of various kinds. However, the sealing problems become much more complicated when a seal is required between three relatively movable bodies as is the case, for example, in rotary piston engines where the bodies which together bound the operating space never to come to a complete standstill relative to one another during engine operation (unlike the top-dead-center and bottom-dead-center position of reciprocating engines).

The most widely known rotary-piston internal combustion engine is the so-called "Wankel" engine. In this construction the sealing problems inherent in a rotary piston engine were solved by limiting the number of relatively rotatable bodies to two, i.e. the tri-lobal rotor and the housing. Sealing is effected by providing the tip of each rotor lobe with a groove extending parallel to the axis of rotation and installing in each groove a sealing strip which is in constant sealing engagement with the inner surface of the housing. An arcuate groove is formed at each rotor end face and sealing strips in these grooves connect with the sealing strips at the tips of the lobes.

However, rotary piston engines are known which, owing to their special construction, are in principle superior to the Wankel engine, These machines have not, heretofore, been able to gain acceptance because they operate with three relatively movable bodies and no reliable way has existed until now to provide a proper gastight seal between these bodies.

SUMMARY OF THE INVENTION

Accordingly, it is a general object of the present invention to provide an arrangement for producing an effective gastight seal between relatively movable bodies in components which may be used in motor-driven vehicles and other applications.

A more particular object is to provide an effective gastight seal between three such relatively movable bodies.

An additional object is to provide an arrangement of the type in question which is relatively simple and not only reliable in use but also easy to install and service.

In pursuance of the above objects, and of still others which will becomes apparent as the description proceeds, one aspect of the invention resides in a sealing arrangement for providing a seal between three relatively movable bodies, particularly between a first body rotating about an axis within a second body and a third body having spaced free end portions and having freedom of reciprocating relative to the first body in direction transversely of the axis of rotation. Briefly stated, such a sealing arrangement may comprise first sealing elements adapted to be mounted on the first body to extend circumferentially thereof and of the axis for sealing engagement with the second body; second sealing elements adapted to be mounted on the free end portions of the third body for sealing engagement with the second body; and third sealing elements adapted to be mounted on the first body to extend lengthwise of the axis and to sealingly engage the first and second sealing elements as well as the second body.

The novel features which are considered as characteristic for the invention are set forth in the appended claims. Both the construction and method of operation of the invention as well as additional objects and advantages thereof, will be best understood from the following description of specific embodiments in connection with the accompanying drawings.

BRIEF DESCRIPTION OF THE DRAWING

FIG. 2 is a perspective view showing the different types of sealing elements used in FIG. 1 (but not showing each individual element), in a spatial arrangement illustrating to co-action of the different types;

FIG. 3 is a perspective view illustrating an arrangement according to another embodiment and;

DESCRIPTION OF PREFERRED EMBODIMENTS

Figure 4:
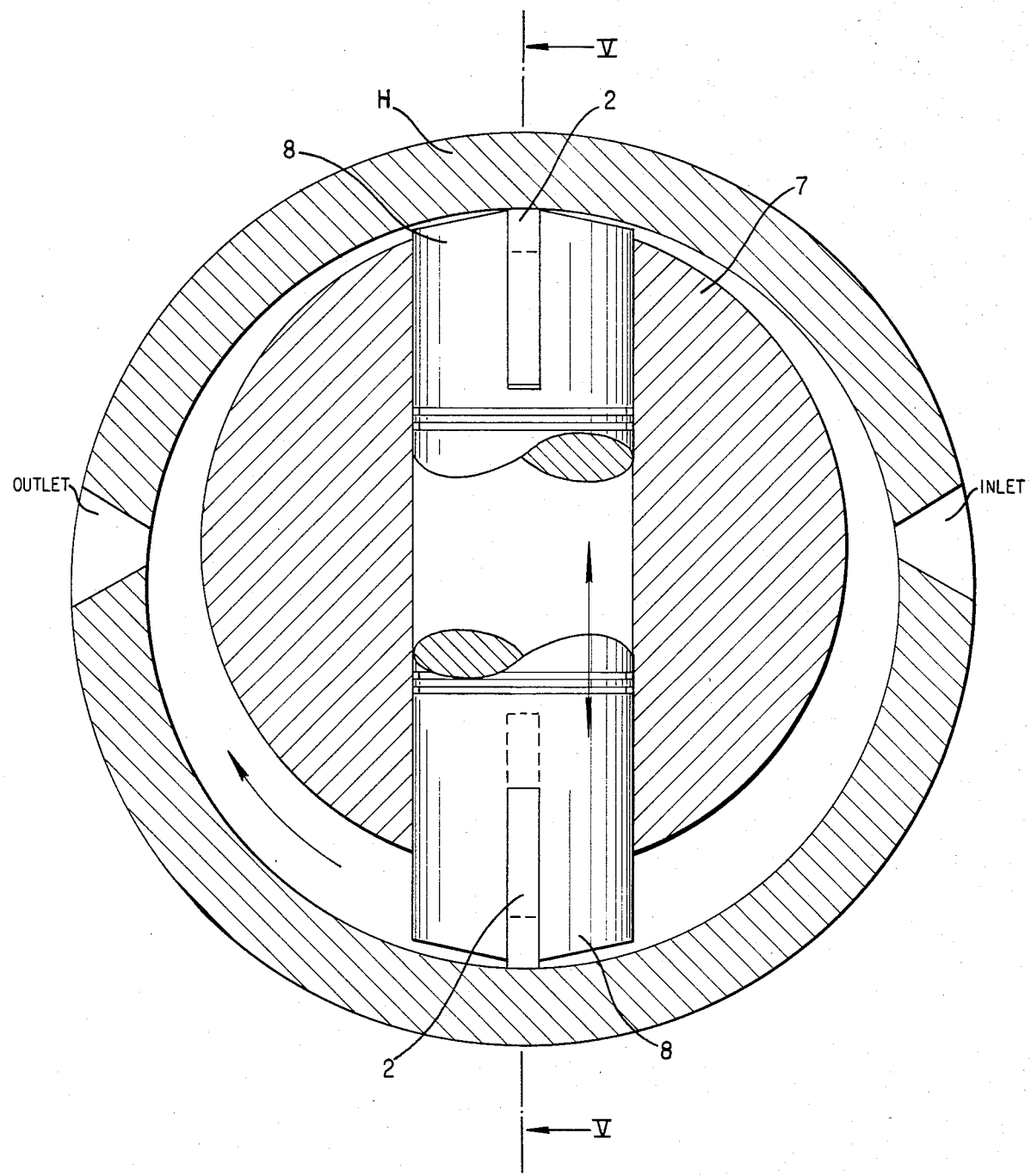
FIG. 4 is a transverse sectional view of a rotary piston engine which embodies the improved sealing arrangement.
Figure 5:
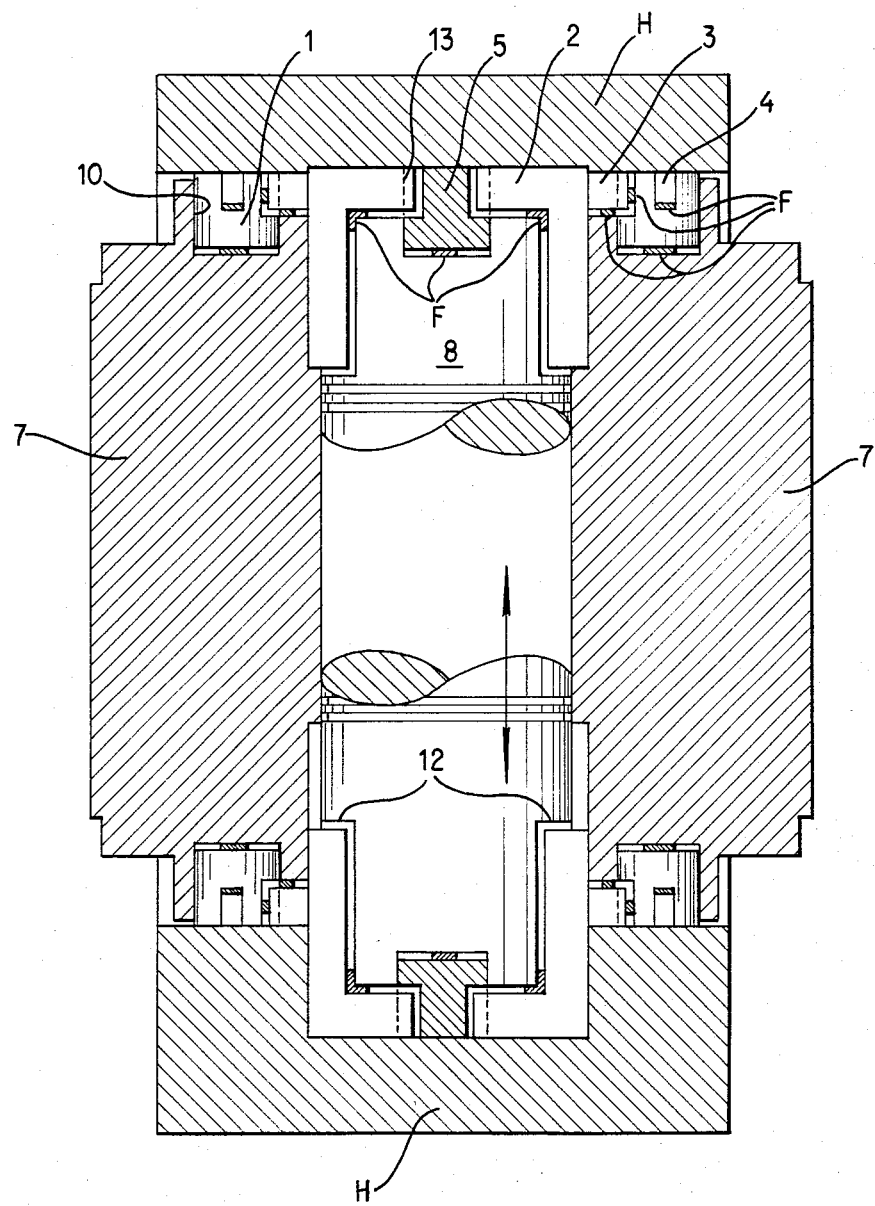
FIG. 5 is a sectional view substantially as seen in the direction of arrows from the line V—V of FIG. 4.

The invention is illustrated in the Figures in which the showing of a vehicle has been omitted for the sake of clarity, in the context of a rotary engine (FIGS. 4 and 5) having three relatively movable components, namely a housing H, a rotor 7 and a power member 8. The housing H has a cylindrical cavity in which the rotor 7 turns about axis A; the cavity is bounded by an inner housing surface HS and the axis A is eccentric (offset) with reference to the center axis of the cavity. For simplicity, the housing and cavity are shown only fragmentarily.

Rotor 7 has a bore 7a extending radially through it midway between its axial ends, in direction normal to the axis of rotation A. Power member 8 is of cylindrical configuration and is slidably received in the bore 7a, so as to reciprocate therein in direction normal to axis A, as indicated by the double-headed arrow B. The member 8 has two free end portions (only one shown) which sealingly and slidingly abut the surface HS at all times when rotor 7 turns: reciprocation of member 8 is the result of this sliding engagement and of the fact that the axis A is offset laterally from the center axis of the cavity in housing H. The engine thus has two operating chambers which are separated from one another during every stage of engine operation.

To seal these operating chambers from one another in a gastight manner, continuously closed sealing boundaries are formed between the housing H, the rotor 7 and the power member 8.

Figure 1:
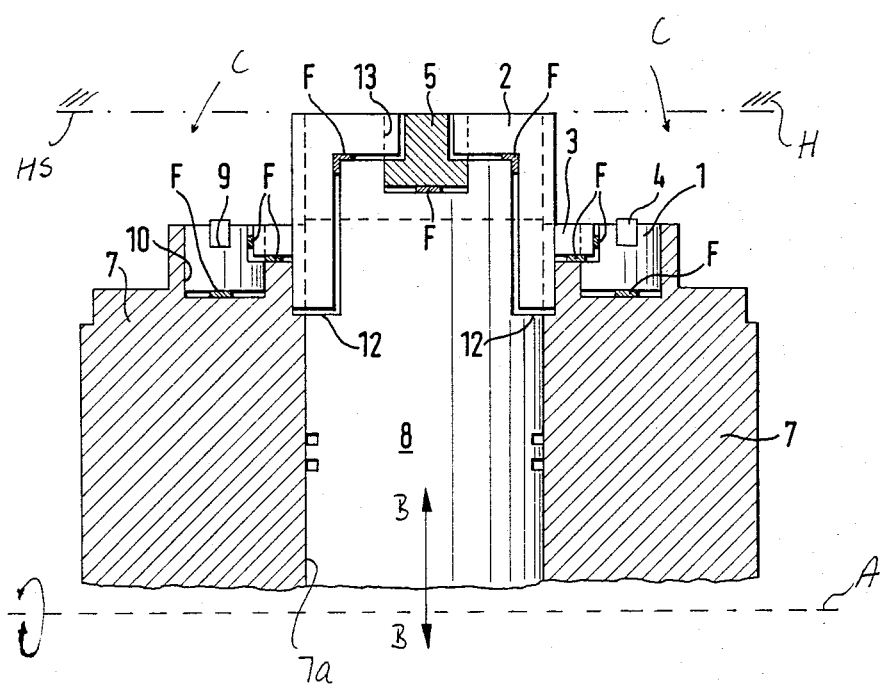
FIG. 1 is a fragmentary, somewhat diagrammatic sectional view of three relatively movable components in an arrangement embodying the invention.

FIGS. 1 and 2 show that a circumferentially extending groove 9 for a strip-like sealing member 4 (FIG. 2) is provided adjacent each of the two ends of the peripheral surface of the rotor 7, which latter has a circular cross section. These sealing members 4 can each consist of a plurality of individual pieces. Blind holes 10 for receiving respective sealing bodies or members 1 (FIG. 2) are provided in the rotor, each located so as to be intersected by a respective groove 9 and the center axes of these bores are aligned with the longitudinal axis of the power member 8. These blind holes 10 are always associated with the sealing elements which will be described hereinafter and which seal both ends of the power member 8 relative to the housing H. Each of the sealing bodies 1 is provided with three recesses 11, 11 and $11^1$, two of which are formed opposite one another in alignment with the sealing members 4 (see FIG. 2). They each receive one end of a respective sealing member 4 or piece thereof. The third recess $11^1$ is disposed at right angles to the other two recesses 11 and is aligned with the longitudinal axis of the power member 8. It goes without saying that the recesses 11 are in each case so dimensioned that the ends of the sealing members 4 are reliably held therein and that the sealing surfaces of the respective sealing members and of the respective sealing body 1 are flush and sealingly abut against the surface HS of housing H. All sealing members and sealing bodies, as well as the angular sealing strips 2 which will be described hereafter, can be biased with the aid of springs F (FIG. 1) towards the respective surfaces to be sealed.

The third recess $11^1$ of each sealing body 1 serves to receive the end of a sealing member 3 (FIG. 2) whose other end forms a sealing boundary with one of two angular sealing strips 2 secured to each end of the power member 8. This sealing member 3 can be of the same material and have the same cross-sectional configuration as the sealing member 4. Unlike the sealing members 4, however, sealing member 3 has two surfaces in sealing engagement, i.e. one sealing surface which cooperates with the surface HS and another sealing surface which extends in the radial direction of the rotor 7 and co-acts with a sealing surface which is always normal to the cylindrically shaped cavity bounded by surface HS. This latter sealing surface belongs to one of the two angular sealing strips 2 which are provided at each end of the power member 8 and which are aligned with the sealing members 3. These sealing strips 2 are imbedded in grooves 12 which are formed in each end of the power member 8 opposite one another. These grooves 12 continue into the axial end surfaces of the power member 8 which face towards the surface HS, thereby assuring a good fit for each of the angular strips 2.

The two sealing strips 2 at each free end of the power member 8 can be joined together (FIG. 2) with the aid of a sealing body 5 which, like the sealing body 1, serves to close off or terminate the spaces of the respective grooves 12. In each case, one sealing body 5 is disposed centrally in each axial end surface of the power member 8 which faces towards the surface HS, and each body 5 is situated in a blind hole 13 intersected by the respective groove 12 (FIG. 1). Each sealing body 5 has in its surface two opposing recesses 11a which accommodate the legs of the angular sealing strips 2 which sealingly co-operate with the housing.

The double-headed arrows A—A and B—B in FIG. 2 indicate the directions of movement of the components which carry the respective sealing elements. The sealing elements 1 and 4 which are respectively disposed adjacent to the axial ends of the rotor 7 and extend circumferentially of the axis A, as well as the sealing member 3 which extends axially of the rotor 7 and transversely to the sealing members 4, rotate together with the rotor 7 in the direction indicated by the arrow A—A. The sealing elements 2 and 5 move together with the power member 8 during its radial reciprocation through the rotor 7 in the direction indicated by arrow B—B. Despite the fact that these movements are inclined to one another, a perfect, gas-tight seal is achieved because the sealing boundary is continuously kept closed with the aid of the sealing members 3. The only movement which occurs between the sealing members 3 and the perpendicular sealing surfaces of the angular sealing strips 2 facing them, is a relative movement in the direction indicated by arrow B—B which can be mastered in good fashion by appropriate known-per-se seals, since the power member 8 is mounted in the rotor 7 for displacement solely in the direction of its own longitudinal axis, i.e. in the direction of arrow B—B.

A second embodiment of the sealing means secured or affixed to the ends of the power member 8 is shown in FIG. 3. In this embodiment, which is otherwise the same as the one in FIGS. 1 and 2, the two angular sealing strips 2a are joined together in gastight manner solely by the appropriate shape of their joints 6, i.e. without the use of members 5. It goes without saying that in the embodiment according to FIG. 3 the blind hole 13 described in conjunction with FIG. 1 is omitted.

A gas channel extending in an elongation of the groove receiving the sealing member 3 may be provided, at least in the sealing body 1, and extends to beneath the sealing member 3 in order to intensify the sealing action by utilizing the gas pressure in the engine to press sealing members 3 outwardly into firm contact with surface HS. The sealing elements described above guarantee a constantly closed sealing boundary between the components 7, 8 as well as with respect to a stationary or movable (rotating) component H in which the component 7 rotates.

The sealing members and sealing bodies as well as the angular sealing strips may consists of any of the known-per-se materials which have already proved themselves for sealing purposes in rotary piston engines. It need not be specifically emphasized that a thin oil film exists at all times between the respectively co-acting sealing surfaces. The invention is also suitable for use with rotary piston engines comprising more than one rotor and is, moreover, especially well suited for other applications, for example for use in such machines as pumps and engines. A rotary piston pump provided with the invention and preferably operating with two rotors, is characterized by a surprisingly high pumping capacity.

While the invention has been illustrated and described as embodied in a seal between three relatively movable bodies, it is not intended to be limited to the details shown, since modifications and structural changes may be made without departing from the spirit of the invention.

What is claimed as new and desired to be protected by Letters Patent is set forth in the appended claims:

1. In a rotary piston engine, the combination of a housing having a cylindrical internal surface; a rotor mounted in said housing for rotation about an axis which is parallel to the axis of said internal surface, said rotor having first and second end portions, a peripheral surface between said end portions and a diametrically extending bore provided in said peripheral surface between said end portions; and elongated body reciprocably installed in said bore and having first and second end portions each adjacent to said internal surface; and sealing means interposed between said housing, said rotor and said elongated body, said sealing means comprising (a) annular first sealing elements surrounding said peripheral surface at the opposite sides of said bore, sealingly engaging said housing adjacent to the respective axial ends of said internal surface and arranged to rotate with said rotor, (b) substantially U-shaped second sealing elements each having a central portion interposed between one end portion of said elongated body and said internal surface and two outer portions extending in substantial parallelism with the axis of said bore at the opposite sides of said elongated body, said second sealing elements being arranged to rotate with said rotor as well as to reciprocate with said elongated body with reference to said rotor, and (c) third sealing elements extending between sealingly engaging said first sealing elements and the outer portions of said second sealing elements and arranged to rotate with said rotor, said outer portions of said second sealing elements being arranged to slide relative to the respective third sealing elements in response to reciprocation of said elongated body in said bore as a result of rotation of said rotor with reference to said housing.

2. The engine of claim 1, wherein said second sealing elements are partially recessed into the respective end portions of said elongated body and said first and third sealing elements are partially recessed into said rotor.

3. The engine of claim 1, further comprising means for biasing said first sealing elements against said housing, means for biasing said second sealing elements against said internal surface and means for biasing said third sealing elements against said housing and against the outer portions of the respective second sealing elements.

4. The engine of claim 1, wherein the central portion of each of said second sealing elements comprises a sealing member recessed into the respective end portion of said elongated body, sealingly engaging the internal surface of said housing and having two recesses disposed substantially diametrically opposite one another, each central portion further comprising a pair of sealing strips each recessed into the respective end portion of said elongated body, extending into one of the recesses in the respective sealing member, each sealingly engaging said internal surface and each integral with the respective outer portion.

5. The engine of claim 1, wherein said housing has two additional surfaces flanking said internal surface and each sealingly engaged by the outer portions of the respective second sealing elements.

6. The engine of claim 1, wherein said bore is a cylindrical through bore and said elongated body has a circular cross-sectional outline.

7. In a rotary piston engine, the combination of a housing having a cylindrical internal surface; a rotor mounted in said housing for rotation about an axis which is parallel to the axis of said internal surface, said rotor having first and second end portions, a peripheral surface between said end portions and a diametrically extending bore provided in said peripheral surface between said end portions; and elongated body reciprocably installed in said bore and having first and second end portions each adjacent to said internal surface; and sealing means interposed between said housing, said rotor and said elongated body, said sealing means comprising (a) annular first sealing elements surrounding said peripheral surface at the opposite sides of said bore, sealingly engaging said housing adjacent to the respective axial ends of said internal surface and arranged to rotate with said rotor, each of said first sealing elements comprising a pair of aligned sealing members each adjacent to a different end portion of said elongated body and having three recesses disposed substantially at 90° to one another, a first arcuate sealing strip having end portions received in the first recesses of said sealing members and a second arcuate sealing strip having end portions received in the second recesses of said sealing members, (b) substantially U-shaped second sealing elements each having a central portion interposed between one end portion of said elongated body and said internal surface and two outer portions extending in substantial parallelism with the axis of said bore at the opposite sides of said elongated body, said second sealing elements being arranged to rotate with said rotor as well as to reciprocate with said elongated body with reference to said rotor, and (c) third sealing elements extending between said first sealing elements and the outer portions of said second sealing elements and arranged to rotate with said rotor, said third sealing elements having first end portions each extending into a third recess of the respective sealing member and a second end portion in sliding engagement with one outer portion of the respective second sealing element, said outer portions of said second sealing elements being arranged to slide relative to the respective third sealing elements in response to reciprocation of said elongated body in said bore as a result of rotation of said rotor with reference to said housing.

* * * * *